United States Patent
Andersson et al.

(10) Patent No.: US 7,466,102 B2
(45) Date of Patent: Dec. 16, 2008

(54) BATTERY UNIT AND VEHICLE EQUIPPED WITH SUCH A BATTERY UNIT

(75) Inventors: Roland Andersson, Sollebrunn (SE); Kent Stake, Uddevalla (SE)

(73) Assignee: SAAB Automobile AB (SE)

( * ) Notice: Subject to any disclaimer, the term of this patent is extended or adjusted under 35 U.S.C. 154(b) by 426 days.

(21) Appl. No.: 11/280,432

(22) Filed: Nov. 16, 2005

(65) Prior Publication Data

US 2006/0125442 A1 Jun. 15, 2006

(30) Foreign Application Priority Data

Nov. 16, 2004 (SE) .................................... 0402798

(51) Int. Cl.
*H02J 7/00* (2006.01)
*H01M 2/10* (2006.01)
*B60R 16/04* (2006.01)

(52) U.S. Cl. ..................... 320/112; 429/99; 180/68.5

(58) Field of Classification Search .............. 320/104, 320/107, 112; 429/96–100; 180/68.5
See application file for complete search history.

(56) References Cited

U.S. PATENT DOCUMENTS

| 4,374,908 A * | 2/1983 | Lindholm et al. | 429/140 |
| 6,495,282 B1 * | 12/2002 | Yoshida et al. | 429/156 |
| 6,497,302 B2 * | 12/2002 | Ryan | 180/274 |
| 7,070,015 B2 * | 7/2006 | Mathews et al. | 180/68.5 |

FOREIGN PATENT DOCUMENTS

EP 1 071 152 1/2001

* cited by examiner

*Primary Examiner*—Jessica Han
*Assistant Examiner*—Emily Pham
(74) *Attorney, Agent, or Firm*—Ostrolenk, Faber, Gerb & Soffen, LLP

(57) ABSTRACT

A battery unit for a motor vehicle, especially an electric-powered or hybrid-powered motor vehicle, includes at least one row of a plurality of separate but linked battery cells. Each cell has parallel, opposing main limit walls. The main limit walls of neighboring battery cells bear substantially flatly one against the other and overlap one another in a sloping position on the support. A fixed deflection ramp is arranged in the vehicle to be able to deflect battery cells upward relative to a horizontal plane or forward or sideways, but out of the row of the battery cells.

17 Claims, 3 Drawing Sheets

BATTERY UNIT AND VEHICLE EQUIPPED WITH SUCH A BATTERY UNIT

BACKGROUND TO THE INVENTION

1. Technical Field

The present invention relates to a battery unit primarily intended for an electric-powered or hybrid-powered motor vehicle and comprising at least one row of a plurality of linked, separate battery cells each having parallel, opposing main limit walls, in which the main limit walls of neighboring battery cells bear substantially flatly one against the other, the neighboring battery cells resting on a support and being mutually oriented such that, with their mutually facing main limit walls, they partially overlap one another.

The invention also relates to a motor vehicle which is equipped with such a battery unit.

2. Related Art

In hybrid-type motor vehicles having a multiplicity of separate battery cells, the positioning of these is often problematical to allow set requirements of good vehicle crash characteristics to be met, since the battery cells take up a relatively large volume which is difficult to deform in the event of a collision. The individual battery cells here form a battery unit which is substantially rectangular, cubic or circular and in which the battery cells stand erect and packed tightly together. They thus form a rigid unit which, in a collision, absorbs the shock load and passes it on to the vehicle construction. This rigid unit therefore has a volume which cannot be used to absorb energy. The result is that the batteries must be placed as safely as possible from the crash area, which often has an adverse effect upon the positioning and configuration of the fuel tank and passenger and luggage compartments, as well as upon the chassis characteristics of the vehicle.

EP 1 071 152 A1 describes a battery unit/motor vehicle of the type described above. In this battery unit, however, there are no means which absolutely ensure that in an impact on the vehicle from the rear or from the side, the battery cells can be compressed and successively deflected upward and possibly forward or sideways.

SUMMARY OF THE INVENTION

The object of the invention is to eliminate the above drawbacks of the known battery units for electric-powered and hybrid-powered motor vehicles and to propose a battery unit for such vehicles in which the individual battery cells in the battery unit are positioned such that the battery unit is flexible in a vehicle collision and the unit is collapsible by displacement and the battery cells which can be suitably caught. To this effect, the battery unit referred to in the introduction and the motor vehicle according to the invention with such a battery has the following elements.

A battery unit for a motor vehicle, especially an electric-powered or hybrid-powered motor vehicle, includes at least one row of a plurality of separate but linked battery cells. Each cell has parallel, opposing main limit walls. The main limit walls of neighboring battery cells bear substantially flatly one against the other and overlap one another in a sloping position on the support. A fixed deflection ramp is arranged in the vehicle to be able to deflect battery cells upward relative to a horizontal plane or forward or sideways, but out of the row of the battery cells.

In a collision, a displacement and collection of the battery cells in the longitudinal and transverse directions of the vehicle can thereby be facilitated, with the battery cells being able to be stacked and collected, with no build-up of load and sliding one upon the other, at an inner end of battery cells arranged in rows. In a displacement and deformation process of the battery cells stacked in a scale-like manner, the electrical connection between the cells can be arranged to be broken, whereby the high voltage level of the battery unit can be reduced to cell level voltage. A battery unit according to the invention could also be used on a vehicle powered purely by an internal combustion engine, i.e. not just on electric-powered or hybrid-powered motor vehicles.

Further distinguishing features of the battery unit, and of the motor vehicle according to the invention which is equipped with such a battery unit, are defined in the following independent patent claims and will emerge in greater detail below with reference to the appended drawings.

DETAILED DESCRIPTION OF THE INVENTION

Figure 1:
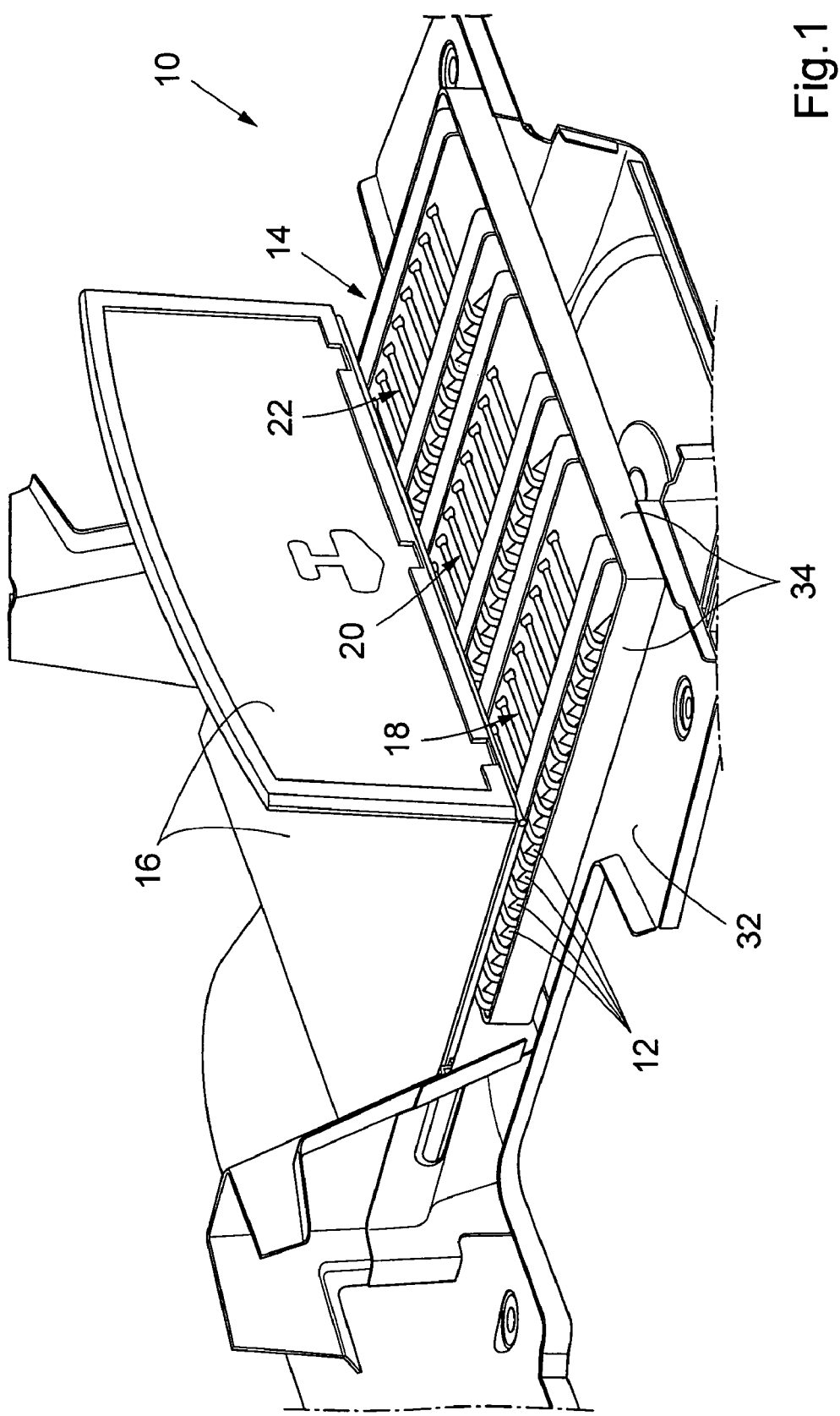
FIG. 1 is a diagrammatic, cut-open perspective view of a rear body section of a hybrid-powered motor vehicle having a flat-shaped, collapsible battery unit according to a first embodiment of the invention.
Figure 2:
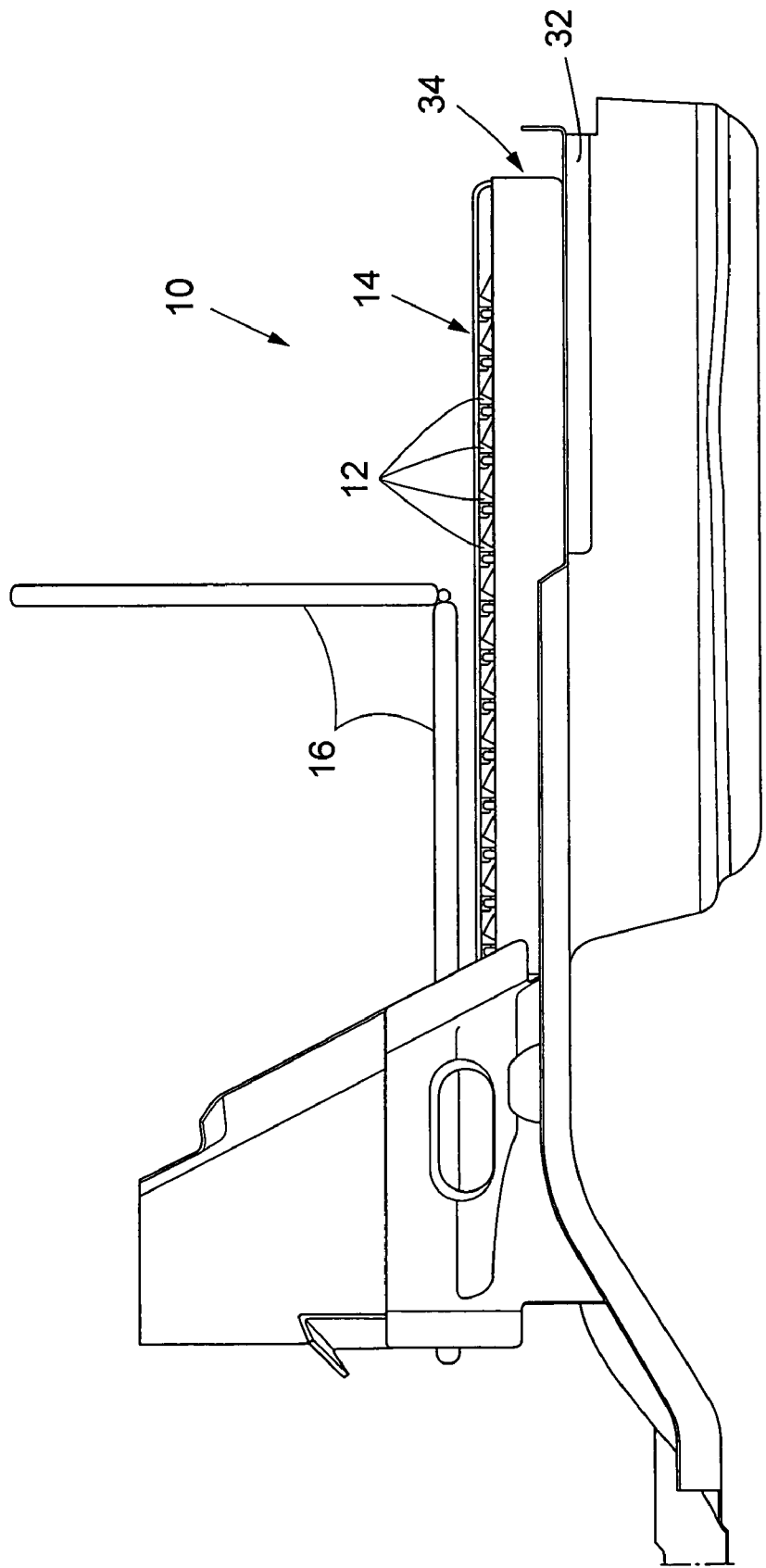
FIG. 2 is a side view of the battery-unit-containing section in FIG. 1.

In FIGS. 1 and 2, 10 denotes in general terms a rear section of a hybrid vehicle in which a battery unit 14 made up of a multiplicity of block-shaped battery cells 12 is mounted substantially horizontally in a space beneath a luggage compartment floor 16 of the vehicle. In the embodiment shown, the battery cells 12 are arranged in three longitudinal rows 18, 20, 22. The individual cells 12 have a substantially flat, parallelepipedal shape with two opposing main limit walls 24, 26 and two opposing end edge faces 28 (see especially FIGS. 3 and 4). The battery cells 12 may, however, have another suitable configuration which allows the cells 12 to slide mutually one upon the other should the battery unit 14 collapse during a vehicle collision, as described below.

Figure 3:
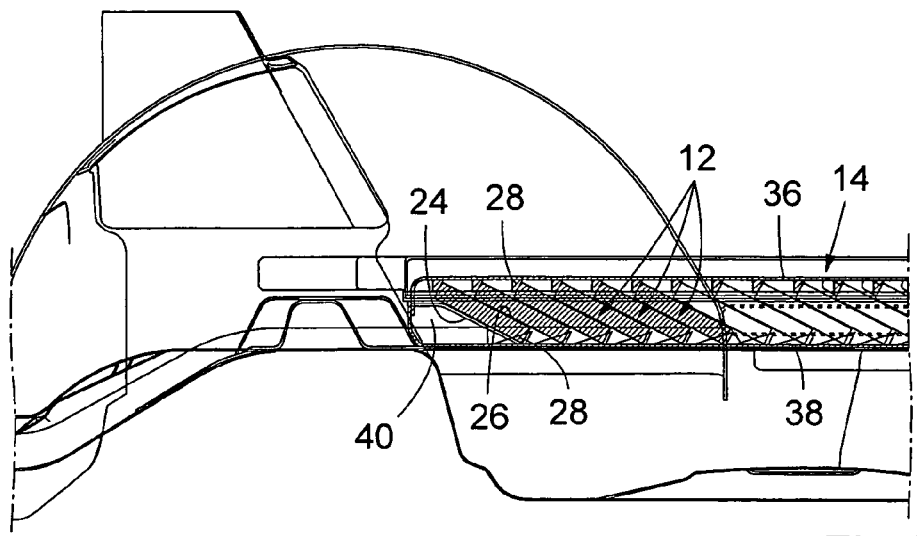
FIG. 3 is a diagrammatic side view of a front section of the battery unit in FIGS. 1 and 2.
Figure 4:
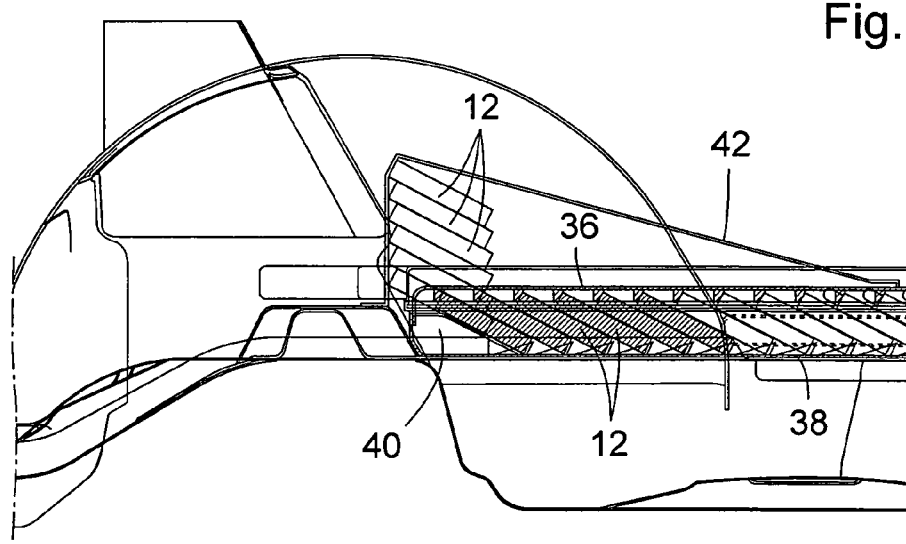
FIG. 4 shows the battery unit in FIG. 3 in a collapsed state.

As best be seen from FIG. 3, the neighboring battery cells 12 in each row 18, 20, 22 are oriented such that, with their mutually facing main limit walls 24, 26, they overlap one another in a scale-like manner with the opposing main limit walls 24, 26 facing obliquely downward and upward, respectively, from an underlying flat section 32 of the vehicle body. The battery cells 12 are installed in a box 34 and held in a forward-sloping position therein by means of upper and lower holding fixtures 36, 38. In the longitudinal direction of the vehicle, the front battery cell 12 in each row bears against a deflection ramp 40, which is shaped such that in the event of a collision in which a vehicle behind runs into and collides with the rear part of the battery unit 14, the ramp successively deflects or guides battery cells 12 to an above-situated collecting space (See FIG. 4), in which they can be detained by means of a flexible catching element, for example a cloth or sack 42. As a result of the scale-like stacking of the battery cells 12 in FIG. 1-4, a battery unit is therefore created which, in a collision, can collapse and be displaced inward within the vehicle and in the longitudinal direction of the vehicle, without absorbing shock loads from, for example, an impacting vehicle. At the same time, the horizontal, scale-like stacking serves to reduce the structural height of the unit, which has a beneficial effect upon the luggage compartment height.

Figure 5:
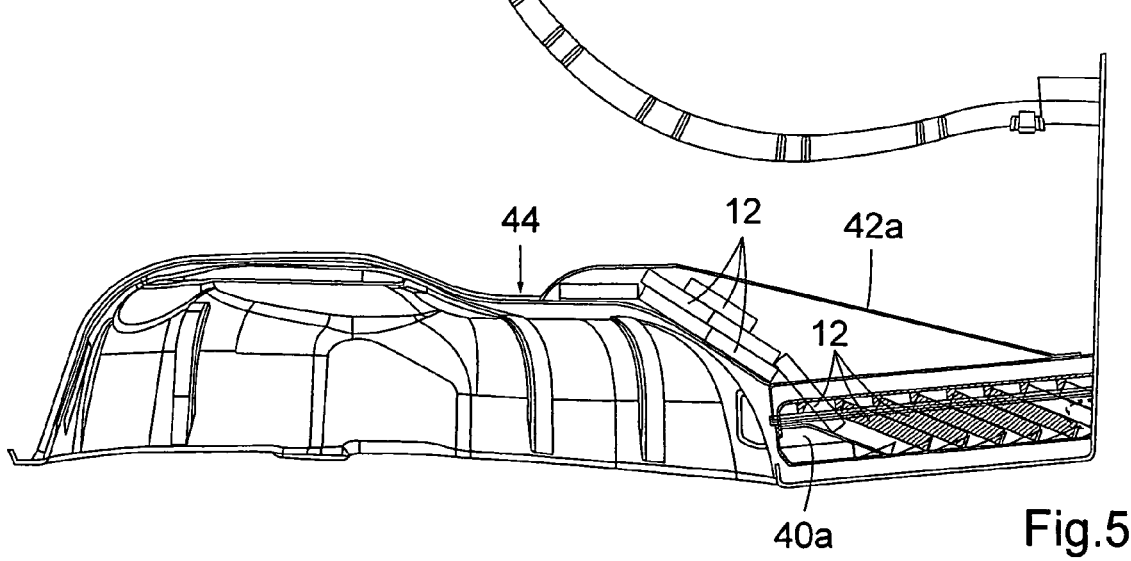
FIG. 5 is a plan view of a second embodiment of the battery unit according to the invention in a collapsed state.

In another embodiment of the battery unit according to the invention, which is shown in a plan view in FIG. 5, the battery cells 12 are likewise stacked in a scale-like manner but standing on end. Although the battery unit thereby acquires a higher structural height than in the horizontal arrangement in FIG. 1-4, it may be placed, on the other hand, just at the sides in the luggage compartment and can there also absorb collision forces from the side, i.e. absorb both transversely directed and longitudinally directed forces. Here too, a flexible catching element in the form of a cloth or sack 42*a* can be provided to detain battery cells 12 which, by a front, fixed deflection ramp 40*a*, have been guided in the lateral direction behind a rear wheel housing 44 of the vehicle should this be run into from the rear, for example, by another vehicle.

Common to the illustrated and described embodiments is the creation, therefore, of a flexible, collapsible battery unit which, in most directions, does not form a rigid unit which absorbs shock energy from external collision objects. In a displacement and deformation process of the battery cells stacked in a scale-like manner, the electrical connections (not shown in the drawings) between the cells 12 can be arranged to be broken, whereby the high voltage level of the battery unit 14 can be reduced to cell level voltage.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A battery unit intended for a motor vehicle and comprising:
    at least one row comprised of a plurality of electrically linked, but separate, battery cells, each cell having parallel, opposite main limit walls, and the cells in the at least one row are positioned to have mutually facing, main limit walls of neighboring battery cells bear substantially flat one against the other,
    a support on which the neighboring battery cells rest;
    the mutually facing walls partially overlap and bear one against another when positioned on the support,
    a deflection ramp in the row, against which one of the battery cells in the row bears when force is applied to the row of battery cells in the longitudinal direction of the at least one row, the deflection ramp being oriented to direct the battery cells out of a direction of extension of the at least one row of battery cells, relative to the support when the force is applied.

2. The battery unit of claim 1, wherein a battery cell located at one end of the at least one row bears against the deflection ramp.

3. The battery unit of claim 1, wherein the deflection ramp is fixed.

4. The battery unit according to claim 1, wherein the battery cells are so shaped the ramp is so oriented and the support is so shaped that the deflection ramp directs the battery cells out of the row and out of the support as each cell in the row in turn is forced against the row.

5. A battery unit intended for a motor vehicle and comprising:
    at least one row comprised of a plurality of electrically linked, but separate, battery cells, each cell having parallel, opposite main limit walls, and the cells in the at least one row are positioned to have mutually facing main limit walls of neighboring battery cells bear substantially flat one against the other,
    a support on which the neighboring battery cells rest;
    the mutually facing walls partially overlap and bear one against another when positioned on the support,
    wherein the battery cells include an edge face that bears against the support, and a battery cell located at one end of each row bears with one of the main limit walls thereof against a fixed deflection ramp, the deflection ramp being oriented to direct the battery cells out of a direction of extension of the at least one row of battery cells, relative to the support when the force is applied.

6. The battery unit according to claim 1, further comprising a flexible catching element at least partially enclosing the battery unit and the element is positioned for receiving the battery cells deflected out of the at least one row thereof.

7. The battery unit according to claim 6, wherein the catching element has the form of a covering cloth or sack.

8. The battery unit of claim 5, wherein a flexible catching element at least partially encloses the battery unit and the element is positioned for receiving the battery cells deflected out of the at least one row thereof.

9. The battery unit according to claim 8, wherein the catching element has the form of a covering cloth or sack.

10. A motor vehicle, comprising:
    a vehicle body;
    the battery unit of claim 1 in the body;
    a fixed deflection ramp in the body and so positioned that in the longitudinal direction of the vehicle, a front battery cell in each row thereof bears against the fixed deflection ramp, and the ramp is arranged and oriented to deflect battery cells upwards out of the row thereof if an external pressure shock is exerted in the longitudinal direction upon the end of the row of battery cells opposite the ramp.

11. A motor vehicle, comprising:
    a vehicle body;
    the battery unit of claim 5 in the body;
    a fixed deflection ramp in the body;
    each of the battery cells having an edge face that rests on the support, and, in the longitudinal direction of the vehicle, a front battery cell in each row thereof bears against the fixed deflection ramp, and the ramp is configured to deflect the battery cells out of the row if an external pressure shock is exerted in the longitudinal direction upon the opposite end of the row.

12. The motor vehicle according to claim 10, further comprising a flexible catching element at least partially enclosing the battery unit and the element is positioned for receiving the battery cells deflected out of the at least one row thereof.

13. The motor vehicle according to claim 12, wherein the catching element has the form of a covering cloth or sack.

14. The motor vehicle according to claim 11, further comprising a flexible catching element at least partially enclosing the battery unit and the element is positioned for receiving the battery cells deflected out of the at least one row thereof.

15. The motor vehicle of claim 14, wherein the catching element has the form of a covering cloth or sack.

16. A motor vehicle, comprising
    a vehicle body;
    a battery unit in the body;
    said battery unit comprising at least one row comprised of a plurality of linked, but separate, battery cells, each cell having parallel, opposite main limit walls, and the cells in the at least one row are positioned to have the mutually facing, main limit walls of neighboring battery cells bear substantially flat one against other, a support on which the neighboring battery cells rests; the mutually facing walls partially overlap one another when positioned on the support, wherein the battery cells include an edge face that bears against the support, a fixed deflection ramp in the body and so positioned that in the longitudinal direction of the vehicle, a front battery cell in each row thereof bears against the fixed deflection ramp, and the ramp is arranged and oriented to deflect battery cells upwards out of the row thereof if an external pressure shock is exerted in the longitudinal direction upon the opposite end of the row of battery cells from the ramp.

17. A motor vehicle, comprising a vehicle body;

a battery unit in the body;

said battery unit comprising at least one row comprised of a plurality of linked, but separate, battery cells, each cell having parallel, opposite main limit walls, and the cells in the at least one row are positioned to have the mutually facing, main limit walls of neighboring battery cells bear substantially flat one against other, a support on which the neighboring battery cells rests; the mutually facing walls partially overlap one another when positioned on the support, a fixed deflection ramp in the body;

the battery cells each have an edge face that rests on the support, and, in the longitudinal direction of the vehicle, a front battery cell in each row thereof bears against the fixed deflection ramp, and the ramp is configured to deflect the battery cells out of the row if an external pressure shock is exerted in the longitudinal direction upon the opposite end of the row.

* * * * *